US008210689B2

(12) United States Patent
Magarill (10) Patent No.: US 8,210,689 B2
(45) Date of Patent: Jul. 3, 2012

(54) PROJECTION SYSTEM

(75) Inventor: Simon Magarill, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 539 days.

(21) Appl. No.: 12/331,124

(22) Filed: Dec. 9, 2008

(65) Prior Publication Data

US 2009/0168028 A1    Jul. 2, 2009

Related U.S. Application Data

(60) Provisional application No. 61/017,987, filed on Dec. 31, 2007.

(51) Int. Cl.
*G03B 21/14*    (2006.01)

(52) U.S. Cl. ........... 353/81; 353/30; 353/31; 353/33; 353/34; 353/37; 353/84; 353/98; 353/99

(58) Field of Classification Search ........... 353/30, 353/31, 33, 34, 37, 38, 81, 84, 98, 99; 359/629, 359/634, 638, 640, 833, 811, 813; 385/52
See application file for complete search history.

(56) References Cited

U.S. PATENT DOCUMENTS

| | | | |
|---|---|---|---|
| 4,913,528 A * | 4/1990 | Hasegawa | 359/638 |
| 5,552,922 A | 9/1996 | Magarill | |
| 5,604,624 A | 2/1997 | Magarill | |
| 6,461,000 B1 | 10/2002 | Magarill | |
| 6,471,356 B1 * | 10/2002 | Gohman et al. | 353/33 |
| 6,644,813 B1 * | 11/2003 | Bowron | 353/31 |
| 6,726,332 B2 | 4/2004 | Cannon et al. | |
| 6,786,604 B2 * | 9/2004 | Aastuen et al. | 353/20 |
| 6,992,830 B1 * | 1/2006 | Mitchell et al. | 359/618 |
| 7,172,290 B2 * | 2/2007 | Li | 353/37 |
| 7,349,604 B2 * | 3/2008 | Clark | 385/52 |
| 7,375,896 B2 * | 5/2008 | Huang | 359/634 |
| 7,518,803 B2 * | 4/2009 | Sawai et al. | 359/638 |
| 2003/0123162 A1 * | 7/2003 | Penn | 359/833 |
| 2004/0246442 A1 * | 12/2004 | Lee et al. | 353/30 |
| 2005/0140932 A1 * | 6/2005 | Magarill et al. | 353/33 |
| 2007/0030456 A1 * | 2/2007 | Duncan et al. | 353/20 |
| 2007/0109507 A1 * | 5/2007 | Ishikura et al. | 353/84 |
| 2008/0074624 A1 * | 3/2008 | Liu et al. | 353/81 |
| 2009/0147331 A1 * | 6/2009 | Ashkenazi | 359/13 |

FOREIGN PATENT DOCUMENTS

EP    1179743 A2    2/2002

* cited by examiner

*Primary Examiner* — Georgia Y Epps
*Assistant Examiner* — Sultan Chowdhury
(74) *Attorney, Agent, or Firm* — Kristofor L. Storvick (57) ABSTRACT

A total internal reflection prism comprises at least two subprisms. The at least two subprisms define an airgap of a uniform thickness following a one-dimensional curve.

20 Claims, 5 Drawing Sheets

PROJECTION SYSTEM

CROSS REFERENCE TO RELATED APPLICATION

This application claims the benefit of U.S. Provisional Patent Application No. 61/017,987, filed Dec. 31, 2007, the disclosure of which is incorporated by reference herein in its entirety.

BACKGROUND

An image projection system includes components used to impose an image on an incident beam of light and to produce an output image beam. A projection system generally includes an image forming component, or imager, such as a liquid crystal on silicon (LCOS) device or a digital micromirror device (DMD). A DMD is a semiconductor device that selectively reflects illumination light to produce imaging light, and includes a multitude of microscopically small, individually controllable mirrors laid out in a matrix on a plane.

In a typical digital light processing (DLP) projection display using a DMD (available from Texas Instruments), light from a light source strikes the imager and is modulated by the micromirrors at each pixel. Each movable mirror can direct the light reflected from its surface so that it goes towards the projection lens system and screen, or off into a reject state where it is blocked from getting to the screen.

One architecture for a DLP projection engine uses a total internal reflection (TIR) prism to separate the illumination light from the imaging light reflected from the DMD imager. A TIR prism has a face that is close to the critical angle of reflection, i.e., it has a face at which light at some angles undergoes total internal reflection and light at other angles passes through the face. This distinction in how light is directed based upon small differences in angle is exploited in a TIR prism to manipulate light in the limited volume available in practical DLP devices.

SUMMARY

In one aspect, the present disclosure provides an image projection system including a panel that selectively reflects an illumination light to produce an imaging light, where the panel comprises a plurality of selectively adjustable reflecting elements arranged in a common plane and the elements are adjustable between at least a first position and a second position. The system also includes a prism comprising a first subprism and a second subprism, a first spaced apart surface of the first subprism being adjacent to a second spaced apart surface of the second subprism, such that the first and second spaced apart surfaces define an airgap that follows a curve. The system also includes a field lens disposed between the airgap and the panel, wherein the field lens transmits the illumination light and the imaging light between the prism and the panel.

In another aspect, the present disclosure provides an image projection system including a panel that selectively reflects an illumination light to produce an imaging light, where the panel comprises a plurality of selectively adjustable reflecting elements arranged in a common plane and the elements are adjustable between at least a first position and a second position. This system also includes a prism having in its interior a first spaced apart surface and a second spaced apart surface defining an airgap that follows a one-dimensional curve and a field lens disposed between the airgap and the panel. In this system, the one-dimensional curve satisfies the condition that for every optical ray path originating at, and propagating normal to, any of the selectively adjustable reflecting elements in the first position, the optical ray path traverses the field lens, proceeds into the interior of the prism, and is incident upon the first spaced apart surface at substantially a critical angle for total internal reflection.

In yet another aspect, the present disclosure provides a total internal reflection prism comprising at least two subprisms, where the at least two subprisms define an airgap of a uniform thickness following a one-dimensional curve.

In still another aspect, the present disclosure provides a method of making a total internal reflection prism. The method includes providing at least one optical material and forming out of the optical material a total internal reflection prism that includes at least two subprisms that form an airgap of a uniform thickness following a one-dimensional curve.

In still yet another aspect, the present disclosure provides an image projection system including a panel that selectively reflects an illumination light to produce an imaging light, the panel comprising a plurality of selectively adjustable reflecting elements arranged in a common plane, the elements being adjustable between at least a first position and a second position, wherein the illumination light and the imaging light are telecentric at the panel. The system also includes a prism comprising a first subprism and a second subprism, a first spaced apart surface of the first subprism being adjacent to a second spaced apart surface of the second subprism such that the first and second spaced apart surfaces define an airgap that follows a one-dimensional curve. Other components of the system include a field lens disposed between the airgap and the panel, wherein the field lens delivers the illumination light to the panel from the prism and transmits the imaging light from the panel to the prism, and a projection lens system that receives the imaging light reflected from the panel to form an image. In this system, the one-dimensional curve is selected to allow substantially all of the illumination light to reach the panel via total internal reflection from the first spaced apart surface, and furthermore, when we consider imaging light comprising portions of the illumination light reflected from the reflecting elements adjusted to the first position, the imaging light is reflected to transmit through the airgap and not to experience total internal reflection at the first spaced apart surface. In this system, non-imaging light comprising portions of the illumination light reflected from the reflecting elements adjusted to the second position is not transmitted by the projection lens system.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present disclosure is described with respect to the appended Figures, wherein.

DETAILED DESCRIPTION

Portable electronic devices can display information to users in a variety of ways. The liquid crystal display (LCD) is a commonly-used type of display. LCDs are limited in size by the dimensions of the devices of which they are components. Recent advances have made possible the incorporation of miniature projectors into portable devices. Such projectors can provide information displays significantly larger in size than the portable devices themselves, allowing for larger audiences for each such display. However, volume and weight constraints inherent to portable devices necessitate creative rethinking of conventional designs. The present disclosure pertains to the design of a miniature image projection system.

An image projection system includes components used to impose an image on an incident beam of light and to produce an output image beam. A projection system generally includes an image forming component, or imager, such as a liquid crystal on silicon (LCOS) device or a digital micromirror device (DMD). Projection systems of the present disclosure are generally compatible with DMDs, although other imagers may be compatible. Projectors involving DMDs are sometimes referred to as digital light processing (DLP) systems.

One architecture for DMD projection systems is characterized by conveying light telecentrically to and from the DMD with a total internal reflection (TIR) prism, as discussed in further detail herein. However, TIR prisms for telecentric DMD projection systems carry a volume and weight penalty, and can make this architecture untenable for portable applications. The present disclosure pertains to the use of smaller TIR prisms with DMD imagers.

Figure 1A:
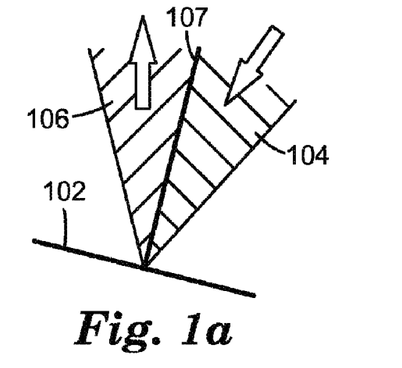
FIGS. 1a and 1b are schematic side views of a reflecting element of a DMD reflecting light when in first and second positions, respectively.
Figure 1B:
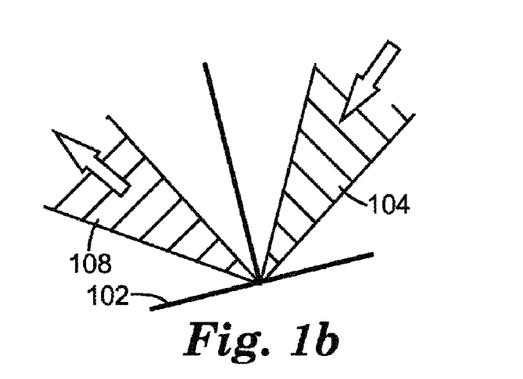

A DMD (available from Texas Instruments) comprises a panel that includes a plurality of relatively small reflecting elements, or micromirrors, arranged in a common plane, typically in a matrix array. Each of the individually addressable reflecting elements corresponds to a pixel and can be selectively adjusted to at least either a first or a second position. A DMD receives illumination light from an illumination system, and selectively reflects it to produce imaging light. Reflective elements adjusted to the first position are disposed to reflect imaging light toward a projection lens system, which receives imaging light and transmits it to form an image on an image plane, such as a screen. FIG. 1a illustrates a reflective element 102 disposed in a first position reflecting illumination light 104 to form imaging light 106. The reflective element 102 rotates between the first and second positions about an axis orthogonal to the plane of the figure. Reflective elements adjusted to the second position reflect illumination light as non-imaging light, such that the non-imaging light is not transmitted by the projection lens system onto the image plane. FIG. 1b illustrates a reflective element 102 disposed in a second position reflecting illumination light 104 to form non-imaging light 108.

Generally, there are a number of ways to keep the incoming (relative to the DMD) illumination light separated from the outgoing imaging light. One method uses physical separation of the illumination and imaging light bundles. The entrance pupil of the projection lens system is then located so as to accept imaging light reflected from micromirrors in the first position and reject light from any other direction.

Another method, employed in embodiments of the present disclosure, uses a total internal reflection (TIR) prism to separate the illumination light from the imaging light reflected from the DMD imager. A TIR prism has a face that is close to the critical angle of reflection, i.e., it has a face at which light incident at some angles undergoes total internal reflection and light incident at other angles passes through the face. The use of a TIR prism with a DMD imager is generally described in U.S. Pat. No. 5,552,922 (Magarill), U.S. Pat. No. 6,461,000 (Magarill), and U.S. Pat. No. 6,726,332 (Cannon and Oehler).

Figure 2A:
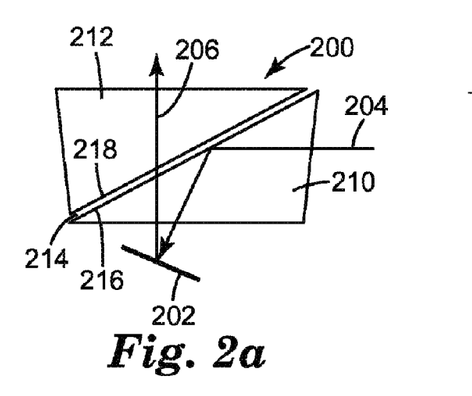
FIGS. 2a and 2b are schematic cross-sectional views of TIR prism and reverse TIR prism configurations, respectively.

FIG. 2a illustrates a mode in which a TIR prism 200 may be employed in a DMD projection system. TIR prism 200 includes a first subprism 210 and a second subprism 212, which are separated by an airgap 214 that is defined by plane parallel first and second spaced apart surfaces 216 and 218, respectively. As used herein, an airgap 214 is generally a volume filled with air having an index of refraction of essentially unity, though other media may be used, as long as the index of refraction of the medium between the spaced apart surfaces 216 and 218 is less than that of at least the first subprism 210. Illumination light 204 enters first subprism 210 and is incident upon the first spaced apart surface 216, at which it undergoes total internal reflection. Subsequently, illumination light 204 is incident upon reflective element 202 of the DMD, shown much larger than to scale with respect to the TIR prism 200 for illustrative purposes. In FIG. 2a, the reflective element 202 is in its first position and reflects illumination light 204, which becomes imaging light 206. Imaging light 206 reenters the first subprism 210 and propagates through the first spaced apart surface 216, the airgap 214, and the second spaced apart surface 218. In contrast to the incidence of illumination light 204 upon first spaced apart surface 216, when imaging light 206 is incident upon the first spaced apart surface, it does so at a smaller angle (with respect to normal) and does not undergo total internal reflection. Note that as the first and second spaced apart surfaces 216 and 218 are parallel, rays of imaging light 206 are not deviated in angle; further, as airgap 214 is thin (much more so than in the schematic drawing), the rays are minimally deviated laterally. After transiting the first and second spaced apart surfaces 216 and 218 and airgap 214, the imaging light 206 propagates through the second subprism 212 and then exits the TIR prism 200, after which it proceeds to be projected onto an image plane to form an image (not shown).

Figure 2B:
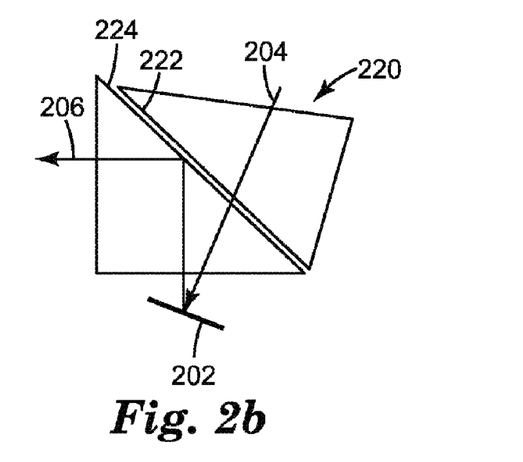

FIG. 2b illustrates a mode in which a "reverse" TIR prism 220 may be employed in a DMD projection system. In this configuration, illumination light 204 transmits through second and first spaced apart surfaces 222 and 224 prior to incidence upon reflective element 202. Reflected imaging light 206 is incident upon first spaced apart surface 224 at greater than the critical angle, experiences total internal reflection, and propagates onward to subsequent projection onto an image plane to form an image.

Figure 3:
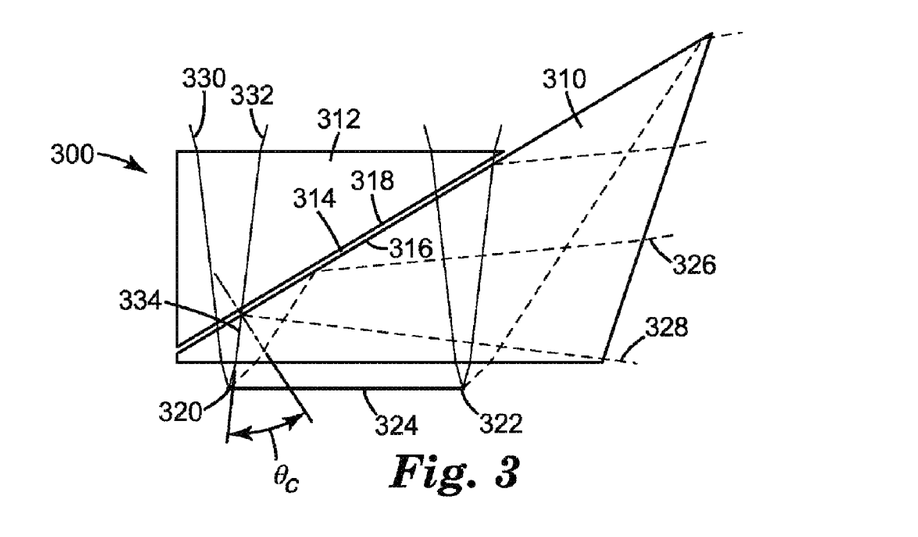
FIG. 3 is a schematic cross-sectional view of a TIR prism configuration.

FIG. 3 presents a more detailed view of a TIR prism configuration similar to that of FIG. 2a. TIR prism 300 includes a first subprism 310 and a second subprism 312, which are separated by an airgap 314 that is defined by plane parallel first and second spaced apart surfaces 316 and 318, respectively. In this figure, illumination light and imaging light are depicted in greater detail, with dashed lines representing marginal rays of illumination light propagating toward the left side 320 and right side 322 of DMD 324, and solid lines representing marginal rays of imaging light propagating away from the DMD. More specifically, rays 326 and 328 are marginal rays bounding the illumination light propagating toward the left side 320 of the DMD 324, and 330 and 332 are marginal rays bounding the imaging light reflecting from the left side of the DMD.

Illumination ray 326 propagates through the system to result in imaging ray 330, and illumination ray 328 results in imaging ray 332. As illustrated in this embodiment, illumination ray 328 and imaging ray 332 propagate in the first subprism 310 in opposite directions along the same path 334. These marginal rays delimit the maximum extents of the bundles of rays, so the fact that rays 328 and 332 lie on the same path 334 indicates that the bundle of illumination rays propagating toward and the bundle of imaging rays reflecting from left side 320 just touch, but do not overlap. In this embodiment of a TIR prism system, the illumination light experiences total internal reflection at the first spaced apart surface 316, and the imaging light does not experience total internal reflection at the first spaced apart surface. From these conditions, one can see that the angle $\theta_c$ that path 334 makes with the normal 336 to the first spaced apart surface 316 should be the critical angle for TIR at the first spaced apart surface. In another configuration, rays 328 and 332 may not necessarily share a common path 334, and the illumination and imaging ray bundles will not necessarily touch, but it will still be the case that total internal reflection at the first spaced apart surface 316 will be experienced by the illumination light, and not by the imaging light; hence the critical angle for TIR will lie between the angles that rays 328 and 332 make with the first spaced apart surface.

Path 334 is the optical path in the first prism 310 of a ray initially normal to a reflective element disposed in the first position located at the left side 320 of the DMD 324. For reference, FIG. 1a shows a normal 107 to the reflective element 102 in the first position. Commonly, all the reflective elements of a DMD imager are oriented alike, so that their normals, while in the first position, will point in the same direction. Hence, in the configuration of FIG. 3, regardless of the location of a reflecting element on the DMD 324, the first spaced apart surface 316 has the appropriate orientation to totally reflect illumination light, and transmit imaging light.

Figure 4A:
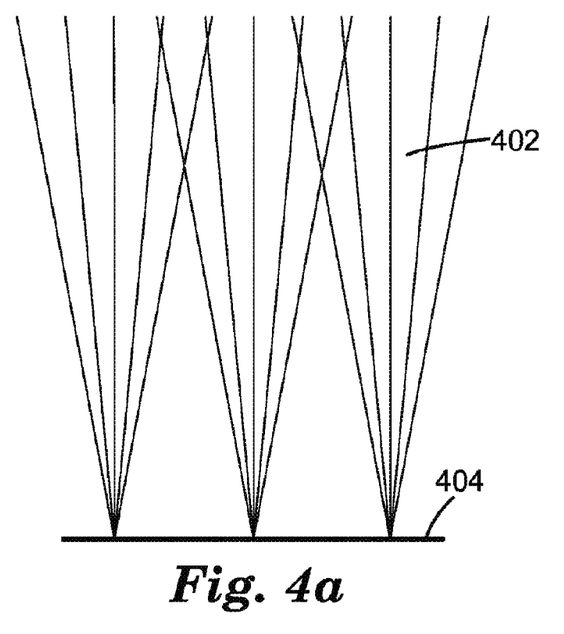
FIGS. 4a and 4b are schematic views of imaging light propagating from a DMD imager without and with a field lens, respectively.
Figure 4B:
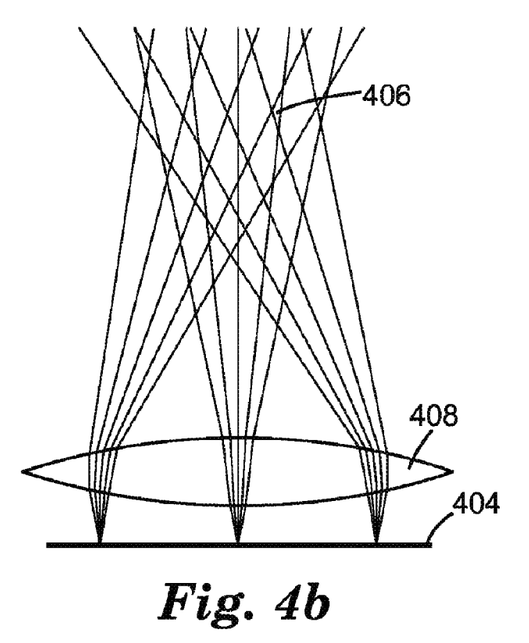

The DMD/TIR prism architecture as described may be used successfully in a variety of projection applications, such as large screen rear projection televisions and projectors for front projection screens. For portable applications such as mobile telephones, however, it would be desirable to modify the design to reduce the size and weight of the image projection system. The size of the TIR prism is dictated by the requirement that it handle illumination and imaging light for the DMD without vignetting. One approach for reducing the size of the TIR prism is to employ a field lens between the DMD and the TIR prism that will reduce the spread of the illumination light and imaging light. This effect is illustrated in FIGS. 4a and 4b. FIG. 4a shows the propagation of imaging light 402 from a DMD imager 404 alone, and FIG. 4b shows the propagation of imaging light 406 from the same imager 404 but also through a field lens 408. The compression of the angular range of the rays allows for a reduction in size of the TIR prism. In both cases—with and without the field lens— the light incident upon and reflected from the DMD is telecentric. In the case with the field lens, however, the illumination and imaging light are not telecentric on the side of the field lens opposite the DMD, where the TIR prism is to be located. This loss of telecentricity in the TIR prism means that the conventional TIR prism will not function as intended, and a new TIR prism design is necessary.

Figure 5:
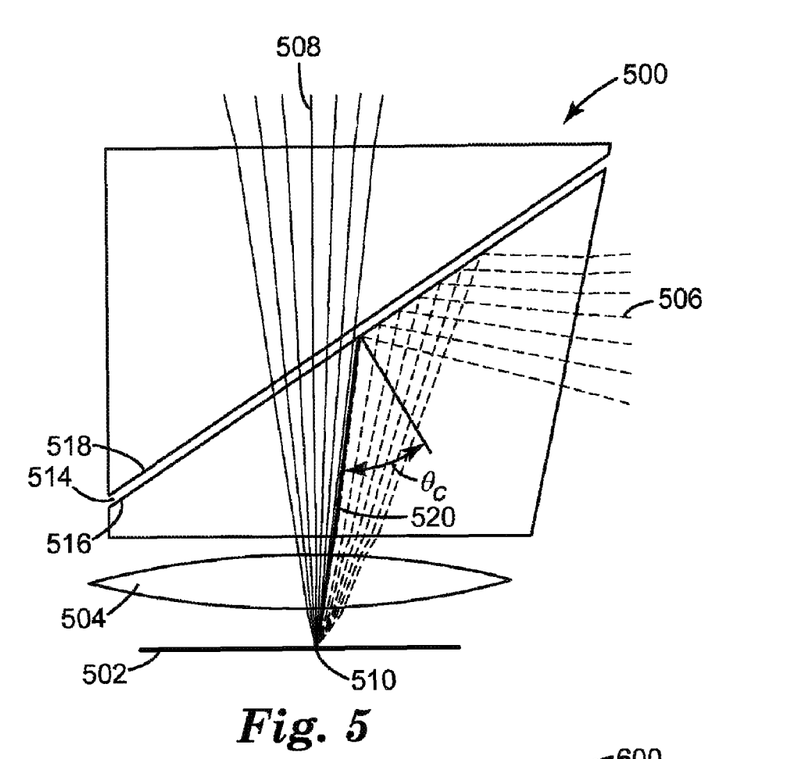
FIG. 5 is a schematic cross-sectional view of components of a projection system including a conventional TIR prism and a field lens, showing propagation of light to and from a particular reflecting element.
Figure 6:
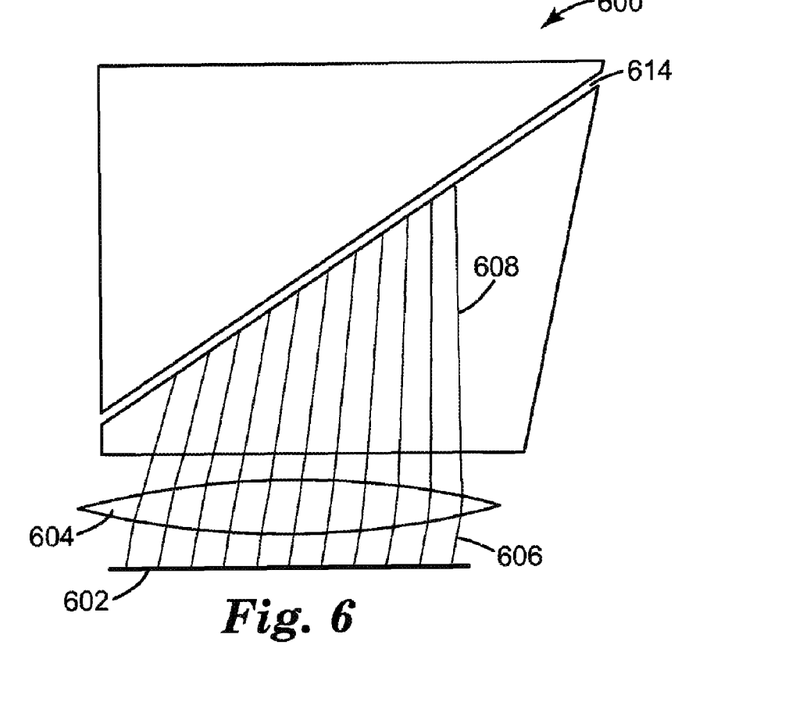
FIG. 6 is a schematic cross-sectional view of of components of a projection system including a conventional TIR prism and a field lens, showing the propagation of rays normal to a plurality of reflecting elements of a DMD imager.

The shortcomings of the conventional TIR prism when used with a field lens may be appreciated with reference to FIGS. 5 and 6. FIG. 5 illustrates a TIR prism 500, DMD 502, and field lens 504. Illumination light 506 and imaging light 508 are associated with a particular reflecting element 510 in the first position. Flat airgap 514, defined by first and second spaced apart surfaces 516 and 518, is oriented appropriately to separate the illumination light 506 and imaging light 508 such that illumination light experiences total internal reflection at first spaced apart surface 516, and imaging light does not. Path 520 represents the optical path in the prism 500 that a normal ray originating at the reflecting element 510 in the first position would take when propagated through all optical elements and surfaces. As before, the proper relationship between this path 520 and the flat airgap 514 is that the path be at $\theta_c$, the critical angle for TIR, as shown. With a flat airgap 514, this can be achieved for a path 520 associated with a particular reflecting element 510. However, referring to FIG. 6, the problem with the convention TIR prism when used with a field lens becomes apparent. FIG. 6 illustrates a TIR prism 600, DMD 602, and field lens 604. FIG. 6 also shows rays 606 normal to a plurality of reflecting elements in the first position across the DMD 602, and the optical paths 608 the rays take when propagated through all optical elements and surfaces and into the prism 600. Adjacent the DMD 602, all the rays 606 are parallel, but after passing through the field lens 604, the optical paths 608 converge. Given this, only one of these optical paths 608 can be incident upon the flat airgap 614 at the critical angle for TIR. For reflecting elements associated with any other optical path 608, some illumination rays associated with the right side of the DMD 602 will be incident on the airgap 614 at less than the critical angle for TIR, resulting in at least partial transmission of light that should be reflected completely. Similarly, some imaging rays associated with the left side of the DMD 602 will be incident at greater than the critical angle, resulting in total reflection rather than transmission through the airgap 614 and projection to form an image.

Figure 7:
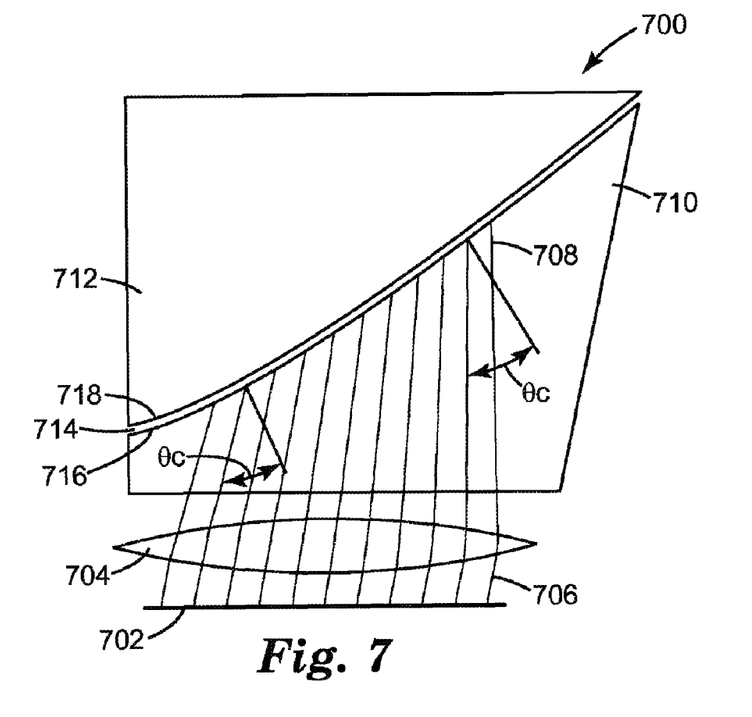
FIG. 7 is a schematic cross-sectional view of components of a projection system including a TIR prism with a curved airgap and a field lens.

This shortcoming of the conventional TIR prism can be overcome with an appropriately designed projection system, as illustrated in FIG. 7. FIG. 7 shows a TIR prism assembly 700, DMD 702, and field lens 704. TIR prism 700 includes a first subprism 710 and a second subprism 712, which are separated by an airgap 714 that is defined by first and second spaced apart surfaces 716 and 718 that follow a one dimensional curve. The one dimensional curve exists in a plane orthogonal to the axis of rotation of the reflective elements of the DMD 702, that is, in the plane of FIG. 7; further, the first and second spaced apart surfaces and airgap are generally (but not necessarily) non-curved in planes parallel to the DMD reflective elements' rotation axis. FIG. 7 also shows rays 706 normal to a plurality of reflecting elements in the first position across the DMD 702. Extending from these normal rays 706 are the optical paths 708 that traverse the field lens, proceed into the interior of the first subprism 710, and are incident upon the first spaced apart surface 716. These optical paths 708 are dictated by refractions through all of the interfaces between media of differing refractive index, as well as any other redirection of light that may occur due to diffraction or other optical effects. When each of the optical paths 708 reaches the first spaced-apart surface 716, it is incident upon the surface at the critical angle for TIR, as the curvature of the first spaced apart surface is selected to satisfy precisely this condition. As the directions of the optical paths 708 vary according to their points of origin across the DMD 702, the angle (or tilt) that the first spaced apart surface 716 makes with a fixed reference plane (e.g., the common plane of the DMD 702) varies as one travels along the first spaced apart surface, encountering optical paths with varying directions. This is illustrated in FIG. 7 at two arbitrary locations along first spaced apart surface 716, showing that the particular optical paths 708 at those locations are incident at $\theta_c$, the critical angle for TIR.

The airgap 714 separating first and second spaced apart surfaces 716 and 718 is generally uniform in thickness along the entire length of the airgap. Accordingly, at any given location along the one dimensional curve that the airgap 714 and first and second spaced apart surfaces 716 and 718 follow, the spaced apart surfaces are locally parallel. When the airgap is sufficiently thin, a ray of imaging light traversing the airgap 714 transmits through first and second spaced apart surfaces 716 and 718 at essentially the same location along the one dimensional curve, where the spaced apart surfaces are parallel. Under such conditions, the imaging light ray will not experience a significant deviation in angle of propagation as a result of traversing the airgap 714. Furthermore, when the airgap 714 is sufficiently thin, imaging light rays traversing the airgap will not experience significant lateral deviation in their path. Hence, when the airgap 714 is sufficiently thin, it will negligibly impact the quality of the imaging light passing therethrough, and in particular, it will not impart appreciable astigmatism to the imaging light. In some embodiments, the thickness of the airgap does not exceed 100 nm. In other embodiments, the thickness of the airgap does not exceed 20 nm. In still other embodiments, the thickness of the airgap does not exceed 5 nm. In reverse TIR prism embodiments as disclosed herein, the airgap will not impart appreciable astigmatism to illumination light.

Figure 8:
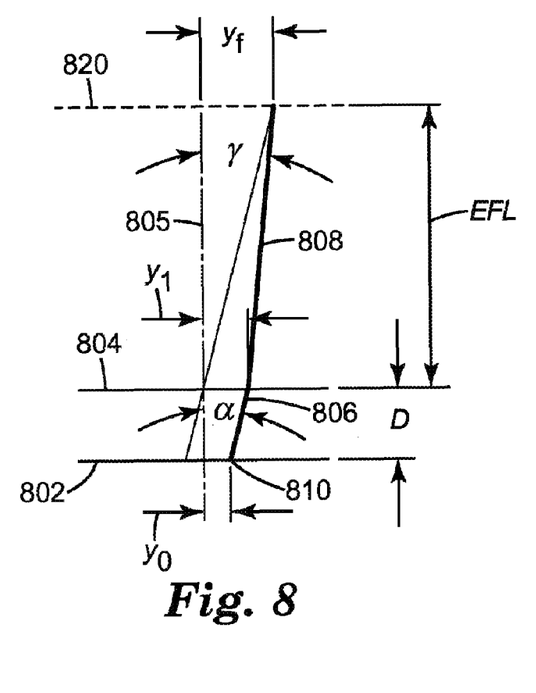
FIG. 8 is a schematic illustration of a paraxial raytracing of a ray in a projection system including a TIR prism and a field lens.

An approximate expression for the tilt of the first spaced apart surface can be derived from a paraxial raytracing argument. In reference to FIG. 8, $y_0$ is the horizontal displacement of a reflective element 810 of the DMD 802 from the optic axis 805 of the field lens, whose principal plane 804 is shown. The principal plane 804 is parallel to the common plane of the DMD 802. From reflective element 810, a ray 806 propagates at an angle $\alpha$ with respect to the optical axis 805. The direction of propagation of ray 806 is normal to the reflective element 810 in the first position. For the current generation of DMD imagers available from Texas Instruments, $\alpha=12°$, although other values for a are feasible. The ray 806 crosses the principal plane 804 of the field lens at a distance $y_1$ from the optical axis 805. At this point, it is redirected and follows optical path 808, which reaches the focal plane 820 of the field lens at a distance $y_f$ from the optical axis 805. Angle $\gamma$, the angle that optical path 808 makes with the optical axis 805, can be found from the following relationships:

$$y_1 = y_0 + D \times \tan(\alpha) \quad y_f = EFL \times \tan(\alpha)$$

-continued $$\tan(\gamma) = \frac{y_f - y_1}{EFL} = \tan(\alpha) - \frac{y_0 + D \times \tan(\alpha)}{EFL}$$

where D is the distance between the DMD 802 and the principal plane 804 of the field lens, and EFL is the effective focal length of the field lens.

The angle $\gamma$ of the optical path 808 in air is translated to the corresponding angle $\gamma_N$ in the prism media (typically glass or polymer) in accordance with Snell's law:

$$\sin(\gamma_N) = \frac{1}{N} \times \sin(\gamma),$$

where N is the refractive index of the prism. The tilt of the first spaced apart surface (i.e., the tilt of the surface relative to the principal plane 804 and common plane of the DMD 802, or, equivalently, the tilt of the normal to the first spaced apart surface relative to the optical axis 805) is defined as $$\text{tilt} = \theta_C - \gamma_N = \arcsin\left(\frac{1}{N}\right) - \gamma_N,$$

where $\theta_c$, as before, is the critical angle for TIR.

Figure 9:
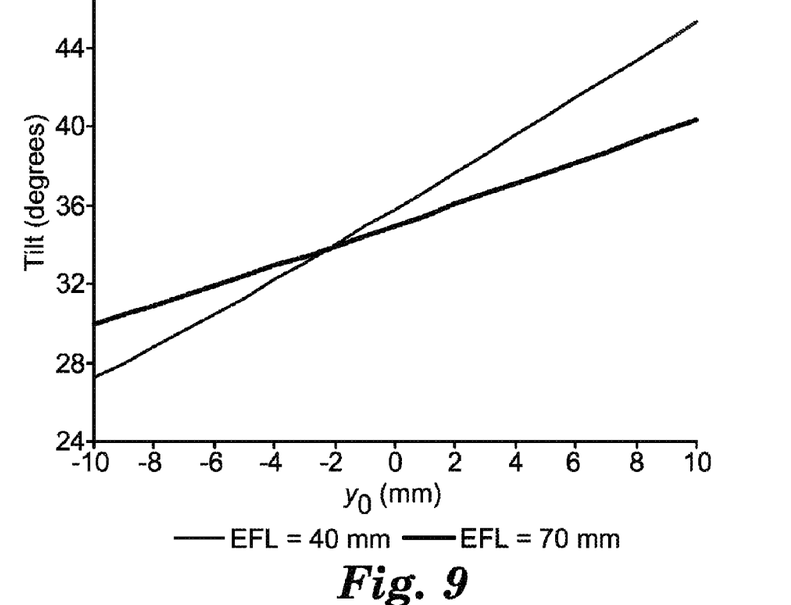
FIG. 9 is a graph showing the dependence of tilt on $y_0$ according to a paraxial raytracing calculation.

FIG. 9 presents a graph of tilt vs. $y_0$ for two different effective focal lengths of the field lens. It can be seen in this paraxial calculation that there is a non-linear relationship between tilt and $y_0$. It will be understood by those of skill in the art that the calculated tilt of the first spaced apart surface as described above and shown in FIG. 9 is exemplary, and that a more complete calculation will take into account aberrations that the paraxial approach neglects. Furthermore, a real field lens may have an aspherical shape to meet other optical design goals, and a proper calculation of the tilt of the first spaced apart surface will account for the particular optical characteristics of the actual field lens.

The field lens, though represented in FIGS. 4b, 5, 6, and 7 as a biconvex lens, may generally take any suitable form. For example, the field lens may include, but is not limited to, spherical or aspherical surfaces, multiple lens elements, refractive index gradients, or diffractive structures. The field lens may include an adjacent surface of the TIR prism, as discussed further herein.

Figure 10:
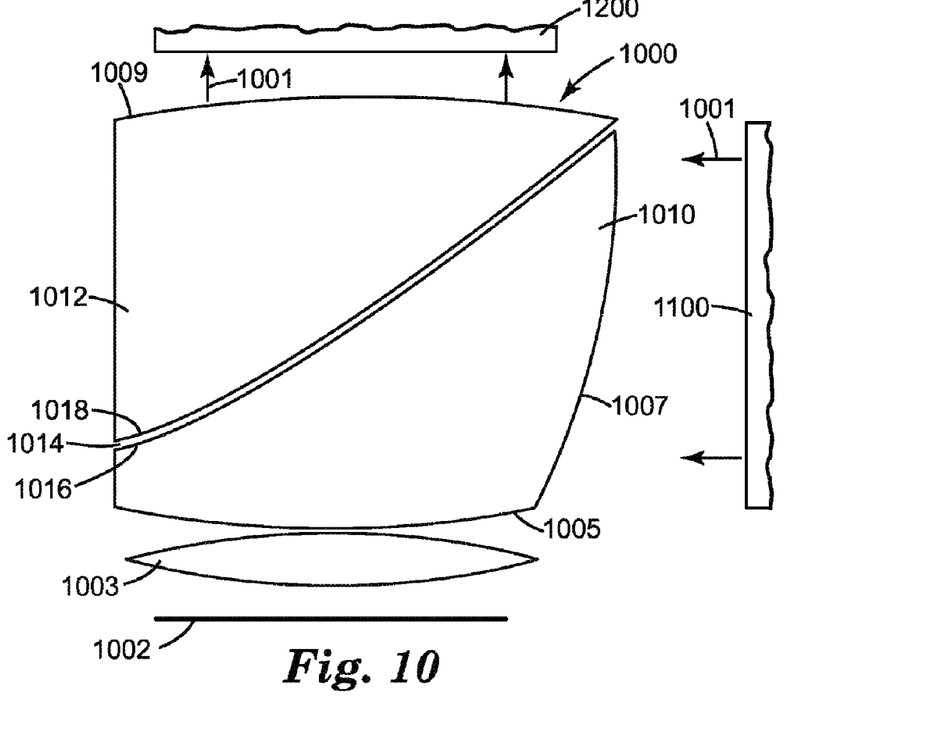
FIG. 10 is a schematic cross-sectional view of components of a projection system including a TIR prism with a curved airgap and curved faces, and a field lens.

FIG. 10 shows elements of a image projection system, including a TIR prism 1000 and a DMD 1002. TIR prism 1000 includes a first subprism 1010 and a second subprism 1012, which are separated by an airgap 1014 that is defined by first and second spaced apart surfaces 1016 and 1018 that follow a one dimensional curve. The first and second subprisms 1010 and 1012 may be made of any suitable optical material or materials, including glass or polymeric materials. First and second subprisms 1010 and 1012 may be made of the same or different material. TIR prism 1000 may include one or more non-planar exterior faces, which may include imager face 1005, illumination face 1007, or projection face 1009. The non-planar exterior face or faces may have one or two dimensional curvatures, spherical or aspherical shapes, fly's eye types structures, or any other suitable structure imparting optical function, including optical power, to the face or faces. In some embodiments, one or more of faces 1005, 1007, and 1009 are tilted to achieve an optical function or functions such as aberration compensation. In one embodiment, the field lens is a lens system that includes field lens elements 1003 and imager face 1005. In another embodiment, lens elements 1003 are not present and the field lens is solely provided by imager face 1005.

Illumination face 1007 and projection face 1009, if non-planar, may be integral parts of the illumination system and projection lens system, respectively. In general, the illumination system includes optical components that deliver light 1001 to the DMD 1002, and the projection lens system includes optical components that transmit light 1001 from the DMD to form an image. For example, the illumination system may include any of illumination elements 1100, illumination face 1007, first spaced apart surface 1016, imager face 1005, and field lens elements 1003. The projection lens system may include any of field lens elements 1003, imager face 1005, projection face 1009, and projection elements 1200. The projection lens system may also be considered to include the airgap 1014 defined by first and second spaced apart surfaces 1016 and 1018, but as discussed herein, if the airgap is sufficiently thin, then it will have negligible impact on the imaging light, and negligible impact on the properties of the projection lens system, including astigmatism.

As discussed herein, the TIR prism 1000 together with the field lens 1003 may be used to provide telecentric illumination light to the DMD 1002. In a telecentric system, the chief rays of every light bundle incident on every reflecting element of the DMD 1002 are essentially parallel, as are the chief rays of every light bundle of the telecentric imaging light reflected from every reflecting element. Another way to express the telecentricity of the system is that the exit pupil of the illumination system is at or near infinity relative to the DMD 1002, and the entrance pupil of the projection lens system is at or near infinity relative to the DMD. Yet another way to express the telecentricity is that the exit pupil of the illumination system and the entrance pupil of the projection lens system are optically conjugate to each other via reflection from the DMD 1002.

Any surface of the TIR prism 1000 may have a coating or coatings that provide optical or other functions. Such surfaces include exterior faces 1005, 1007, and 1009, as well as the first and second spaced apart surfaces 1016 and 1018. Anti-reflection coatings may be used advantageously on any of these surfaces. In particular, anti-reflection coatings may be used on the first and second spaced apart surfaces to reduce Fresnel reflections at angles of incidence close to the critical angle for total internal reflection.

This disclosure has discussed a projection system that provides illumination light via total internal reflection from a one-dimensionally curved first spaced apart surface 1016 to a DMD 1002 having an adjacent field lens, and transmits reflected imaging light through an airgap 1014. Those of skill in the art will also recognize that the principles of the one-dimensionally curved airgap may be advantageously applied to a reverse TIR prism configuration, in which light is delivered to a DMD having an adjacent field lens by transmission through the airgap, and in which imaging light experiences total internal reflection at a first spaced apart surface following a one dimensional curve. Such a configuration may be schematically represented by the components illustrated in FIG. 10, with illumination elements now labeled 1200 and projection elements labeled 1100, and the light 1001 reversing directions of propagation.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An image projection system comprising:
   a panel that selectively reflects an illumination light to produce an imaging light, the panel comprising a plurality of selectively adjustable reflecting elements arranged in a common plane, the elements being adjustable between at least a first position and a second position; and
   a prism comprising a first subprism and a second subprism, a first spaced apart surface of the first subprism being adjacent to a second spaced apart surface of the second subprism, the first and second spaced apart surfaces defining an airgap that follows a curve, wherein the prism comprises a total internal reflection prism; and
   a field lens disposed between the airgap and the panel, wherein the field lens transmits the illumination light and the imaging light between the prism and the panel.

2. The image projection system of claim 1, wherein substantially all of the illumination light undergoes total internal reflection at the first spaced apart surface, and wherein substantially none of the imaging light undergoes total internal reflection at the first spaced apart surface.

3. The image projection system of claim 1, wherein substantially all of the illumination light transmits through the second and first spaced apart surfaces without undergoing total internal reflection, and wherein substantially all of the imaging light undergoes total internal reflection at the first spaced apart surface.

4. The image projection system of claim 1, wherein the curve is a one-dimensional curve.

5. The image projection system of claim 1, further comprising a projection lens system disposed to transmit the imaging light, wherein the imaging light comprises portions of the illumination light reflected from the reflecting elements adjusted to the first position, and further wherein the projection lens system substantially does not transmit a non-imaging light comprising portions of the illumination light reflected from the reflecting elements adjusted to the second position.

6. The image projection system of claim 5, wherein an entrance pupil of the projection lens system is optically conjugate, via reflection from the panel, to an exit pupil of an illumination system comprising the field lens and the prism.

7. The image projection system of claim 1, wherein the illumination light and the imaging light are telecentric at the panel.

8. The image projection system of claim 1, wherein the airgap has a uniform thickness along the curve.

9. The image projection system of claim 8, wherein the airgap having the uniform thickness imparts negligible astigmatism to a light transmitting through the airgap.

10. The image projection system of claim 8, wherein the uniform thickness is less than about 100 micrometers.

11. The image projection system of claim 1, further comprising an anti-reflection coating on the first and second spaced apart surfaces.

12. The image projection system of claim 1, wherein the prism further comprises at least one exterior face providing an optical power.

13. The image projection system of claim 12, wherein the at least one exterior face is aspherical.

14. The image projection system of claim 12, wherein at least a portion of the field lens comprises the at least one exterior face having the optical power.

15. The image projection system of claim 1, wherein the prism comprises a polymeric material.

16. The image projection system of claim 1, wherein the prism comprises a glass.

17. An image projection system comprising:
- a panel that selectively reflects an illumination light to produce an imaging light, the panel comprising a plurality of selectively adjustable reflecting elements arranged in a common plane, the elements being adjustable between at least a first position and a second position;
- a prism having in its interior a first spaced apart surface and a second spaced apart surface defining an airgap that follows a one-dimensional curve; and
- a field lens disposed between the airgap and the panel;
- wherein the one-dimensional curve satisfies the condition that for every optical ray path originating at, and propagating normal to, any of the selectively adjustable reflecting elements in the first position, the optical ray path traverses the field lens, proceeds into the interior of the prism, and is incident upon the first spaced apart surface at substantially a critical angle for total internal reflection.

18. A total internal reflection prism comprising at least two subprisms, the at least two subprisms defining an airgap of a uniform thickness following a one-dimensional curve.

19. A method of making a total internal reflection prism comprising:
- providing at least one optical material;
- forming out of the optical material a total internal reflection prism that includes at least two subprisms that form an airgap of a uniform thickness following a one-dimensional curve.

20. An image projection system comprising:
- a panel that selectively reflects an illumination light to produce an imaging light, the panel comprising a plurality of selectively adjustable reflecting elements arranged in a common plane, the elements being adjustable between at least a first position and a second position, wherein the illumination light and the imaging light are telecentric at the panel;
- a prism comprising a first subprism and a second subprism, a first spaced apart surface of the first subprism being adjacent to a second spaced apart surface of the second subprism, the first and second spaced apart surfaces defining an airgap that follows a one-dimensional curve;
- a field lens disposed between the airgap and the panel, wherein the field lens delivers the illumination light to the panel from the prism and transmits the imaging light from the panel to the prism; and
- a projection lens system that receives the imaging light reflected from the panel to form an image;
- wherein the one-dimensional curve is selected to allow substantially all of the illumination light to reach the panel via total internal reflection from the first spaced apart surface;
- further wherein the imaging light comprises portions of the illumination light reflected from the reflecting elements adjusted to the first position, the imaging light being reflected to transmit through the airgap and not to experience total internal reflection at the first spaced apart surface; and
- still further wherein a non-imaging light comprises portions of the illumination light reflected from the reflecting elements adjusted to the second position, such that the non-imaging light is not transmitted by the projection lens system.

* * * * *

UNITED STATES PATENT AND TRADEMARK OFFICE
CERTIFICATE OF CORRECTION

| | | |
|---|---|---|
| PATENT NO. | : 8,210,689 B2 | Page 1 of 1 |
| APPLICATION NO. | : 12/331124 | |
| DATED | : July 3, 2012 | |
| INVENTOR(S) | : Simon Magarill | |

It is certified that error appears in the above-identified patent and that said Letters Patent is hereby corrected as shown below:

Column 7

Line 57, delete "a" and insert -- α -- therefor.

Signed and Sealed this
Eleventh Day of September, 2012

David J. Kappos
*Director of the United States Patent and Trademark Office*